United States Patent [19]

Ingalsbe

[11] Patent Number: 4,920,555
[45] Date of Patent: Apr. 24, 1990

[54] COMPACT TELEPHONE LINE TEST APPARATUS

[75] Inventor: Daryl E. Ingalsbe, Blair, Nebr.

[73] Assignee: Independent Technologies, Inc., Omaha, Nebr.

[21] Appl. No.: 249,825

[22] Filed: Sep. 27, 1988

[51] Int. Cl.⁵ .......................... H04M 1/24; H04B 3/46
[52] U.S. Cl. ........................................... 379/21; 379/27
[58] Field of Search ........................ 379/21, 27, 26, 22

[56] References Cited

U.S. PATENT DOCUMENTS

| | | | |
|---|---|---|---|
| 2,956,229 | 10/1960 | Henel | 324/133 |
| 4,209,671 | 6/1980 | Charles et al. | 179/175 |
| 4,564,728 | 1/1986 | Romano | 179/175.3 R |
| 4,600,810 | 7/1986 | Feldman et al. | 179/175.3 R |
| 4,756,017 | 7/1988 | Bush | 379/22 |

Primary Examiner—Stafford D. Schreyer
Attorney, Agent, or Firm—Anthony G. Eggink; Joel D. Skinner, Jr.

[57] ABSTRACT

A telephone line test apparatus is provided for determining the operational status of a telephone line. The apparatus has a cylindrical and compact housing structure, a light emitting diode, a resistor, an electrical interface, and an elongated cable with a terminal modular connector. The electrical interface is disposed within the housing structure and connects the light emitting diode and the resistor in series. The modular connector is communicatively connected to the electrical interface and flexible extends from the housing structure for easy and reliable use. The light emitting diode is a tri-state LED which indicates the presence of D.C. voltage and polarity, as well as A.C. voltage.

17 Claims, 3 Drawing Sheets

COMPACT TELEPHONE LINE TEST APPARATUS

BACKGROUND OF THE INVENTION

This invention relates to electronic testing apparatus and particularly to a compact telephone circuitry testing device. The device is particularly useful to determine the operational status of telephone circuitry.

In the past, responsibility for maintenance of interconnect wiring within the user or customer premises resided with the telephone company. However, in accordance with recent Federal Communications Commission (FCC) decisions, this responsibility has been transferred to the telephone user. Typically, the telephone companies will no longer maintain customer premises wiring without a service charge. As a result, there has arisen a need for a simple, yet practical test device which is usable by consumers to test for common telephone circuit conditions, to identify their location, and to verify operative lines.

The recent expansion of telephone networks has also resulted in complex and variable interconnect wiring installations. This has made cable identification and trouble isolation a more difficult and time consuming task for repair and installation technicians. Thus, there has arisen a need in the telecommunications industry for an apparatus which simplifies the proper identification of operative lines which are used to connect test and other telephone equipment and which increasingly utilize modular connectors. The telephone line test device of this invention provides an apparatus to identify particular lines and to troubleshoot such telephone installations. Although, test devices have been used or proposed which utilize modular plugs or jacks and which determine line status, these prior art devices have often been complex, expensive, unreliable, bulky, and difficult to use, particularly by typical consumers. Despite the need for a test device which is effective and simple to use by technicians and consumers, and which overcomes these prior art limitations, none insofar as is known has been proposed or developed. The circuitry testing device of the present invention provides telecommunication technicians and customers with such a versatile, compact, economical and easy to use test apparatus.

SUMMARY OF THE INVENTION

The present invention provides a compact electronic testing apparatus which quickly and easily connects to a telephone line to indicate the line status. The device is connectable to a modular connecting jack such as in a telephone wall outlet. The device tests for common line conditions including open line, direct current (D. C.) and polarity and alternating current (A. C.). The device also verifies telephone line continuity. The telephone line test apparatus comprises a cylindrical housing structure with opposing apertures, a light emitting diode and resistance means connected in series by an electrical interface. A modular connector extends from an aperture of the housing structure and is communicatively connected to the electrical interface, preferably via a flexible electrical conductor. The light emitting diode (LED) is a tri-state LED to visually indicate telephone line D.C. voltage continuity and polarity and line trouble conditions including D.C. polarity reversal, A.C. voltage presence, and lack of line continuity. The modular connector extends from the second aperture of the housing structure and is communicatively connected to the electrical interface.

The compact telephone line test device preferably has fastening means disposed on the housing structure for ease of carrying by the user. The LED is retained by a gasket and the flexible electrical conductor is secured by a strain relief connector. The resistance means is preferably a resistor of approximately 3.3 kilohms, which limits current to the LED. The device is useable on temporary or permanent telephone installations and provides connections to one or two pair modular plugs. It may be used for either troubleshooting or installation purposes.

These and other benefits of this invention will become clear from the following description by reference to the drawings.

DESCRIPTION OF THE PREFERRED EMBODIMENT

Figure 1:
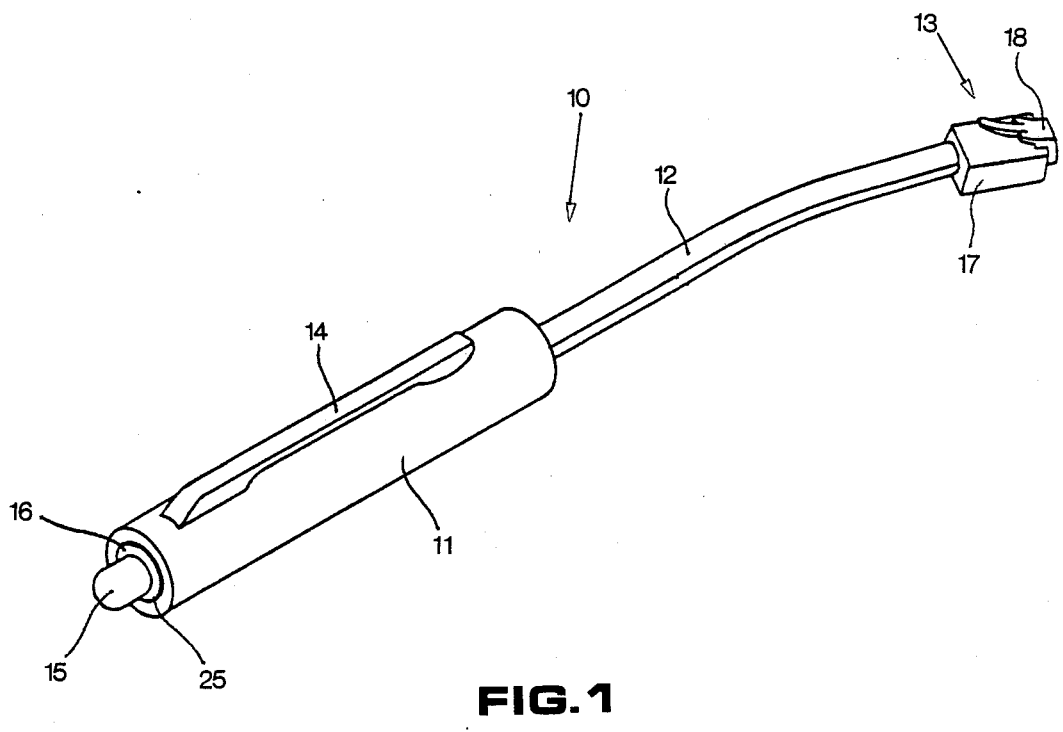
FIG. 1 is a perspective view of the compact telephone line test apparatus of/the present invention.

Referring to FIG. 1, the telephone line test device 10 is shown comprised of a pen-top type body structure 11 of approximately 2.5 inches (60 mm) in length and having a clip 14 mounted thereon. The body structure 11 has a light emitting diode (LED) 15 extending from one end and a cable 12 having a terminal modular connecting plug 13 extending from its opposite end. The modular plug 13 connects to one or two conductor pair modular jacks, as found in standard wall outlets, for example. The device 10 is utilized to test at the modular jacks for common telephone line trouble conditions, such as open lines, D.C. polarity reversals, and A.C. line voltage.

The configuration and structure of the telephone line test apparatus 10 provides a compact device having an overall length of approximately 5 inches (120 mm) and which is easy to store and use by telephone technicians and consumers. The pen-style clip 14 and compact body structure 11 provides ready access and use and is transportable in a shirt pocket or in other holding or storing devices. The male-type modular connecting plug assembly 13 provides a quick and easy means to connect to female-type modular plugs commonly used in the telephone industry. The modular plug 13 is shown to have a rectangular body portion 17 and a quick-release clip 18. The modular plug 13 is easily inserted and removed using one hand. The modular plug 13 is communicatively connected to the body structure 11 of the device 10, preferably via a flexible cord or cable 12 of sufficient length to allow the device to be attached to a variety of wall outlet configurations and locations and to other connection interface assemblies. A cable 12 length of about 3 inches (76 mm) has been found to be particularly desirable in that it provides sufficient length for use in a variety of applications, but is still compact for storage purposes. At the opposite end of the device 10, and connected to and extending from the housing structure 11, is the LED 15. In the position shown, the LED 15 is easily viewable by the technician or consumer for quick reading of the line test results.

Figure 2:
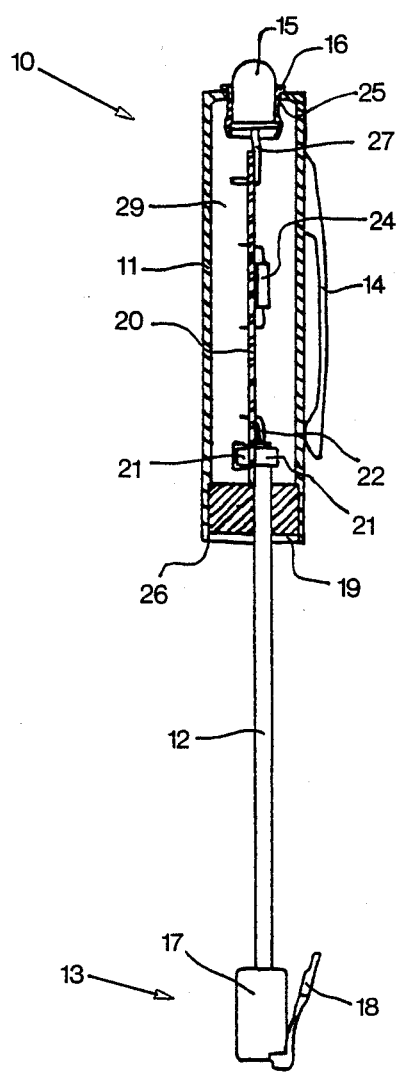
FIG. 2 is a cross-sectional view of the compact telephone line test apparatus and showing a side view of its interiorly disposed circuitry.
Figure 3:
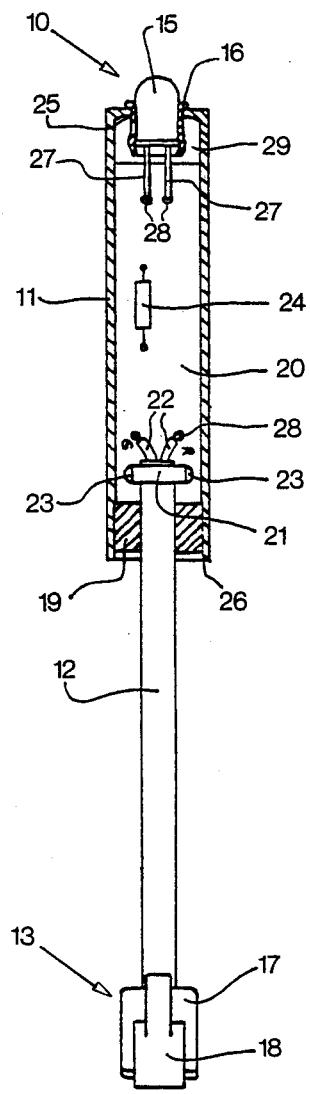
FIG. 3 is a cross-sectional view of the compact telephone line test apparatus shown in FIG. 2, showing a top view of its interiorly disposed circuitry.

FIGS. 2 and 3 are top and side views of the telephone line test apparatus 10 and which are shown partially in cross-section to show the internal elements of the housing structure 11. The housing structure 11 has an elongated cylindrical configuration having an internal cavity 29 and opposing apertures 25 and 26 at its ends. Aperture 26 is substantially coextensive with the circumferential wall of one end of the housing structure 11, and the opposing aperture 25 has a slightly smaller diameter. The housing structure 11 is preferably constructed of a plastic composition, such as a white pigmented ABS or the like. A pen-style clip 14 is attached to the exterior of the housing structure 11 to provide means to secure the device 10 in a garment pocket, or the like.

The tri-state LED 15 is disposed at one end of the housing structure 11. The LED 15 has a generally cylindrical lens portion with a hemispherical end and a flat end from which extend a pair of electrodes 27. The LED 15 is resiliently encased by a gasket 16 which is inserted into the aperture 25. The LED holder or gasket 16 is preferably constructed of a plastic material and is generally ring-shaped and has a top flange portion. The LED gasket 16 has an outside diameter generally equivalent to that of aperture 25 and an inside diameter generally equivalent to the LED 15. The hemispherical lens end of the LED 15 is exposed for viewing on the outside of the housing structure 11. The electrodes 27 extend into the interior of the housing structure 11 for electrical connection to a printed circuit board (PCB) 20 which is mounted in the internal cavity 29.

As further shown in the drawings, the electrodes 27 of the LED 15 are connected through apertures 28 of the printed circuit board 20, via solder, for example. Also connected to the printed circuit board 20 at and via apertures 28, is a resistor 24. The printed circuit board 20 is preferably elongated and rectangular having dimensions to frictionally fit within the internal cavity 29. The printed circuit board 20 preferably has a single-sided conductive network 30 having a thickness of approximately 0.03 inches (0.80 mm).

The conductor cord or cable 12 is preferably an insulated cable and having a pair of internal and insulated line conductors 22. The line conductors 22 are preferably color coded red and green, as known in the telecommunications art, to designate ring and tip conductors, respectively. The cable conductor 12 extends through a plug assembly 19 which is disposed in aperture 26 of the housing structure 11. The plug assembly 19 is preferably constructed of PVC or the like and adhesively secured in the housing structure 11. The plug assembly 19 has an aperture for extension of the cable 12.

Figure 4:
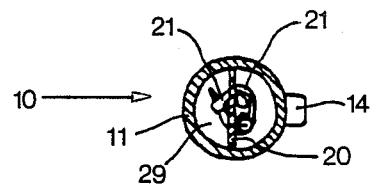
FIG. 4 is a cross-sectional view of the compact telephone line test apparatus shown in FIG. 2, showing an end view of its interiorly disposed circuitry.

The flexible conductor cable 12 is preferably attached to the printed circuit board 20 by a fastener 21. The fastener or tie wrap 21 surrounds the terminal end of cable 12 to provide strain relief to the cable 21 and is secured by a pair of apertures 23 in the printed circuit board 20 as is shown in FIG. 4. The individual line conductors 22 are communicatively attached by solder or the like to the printed circuit board 20 at apertures 28.

Figure 5:
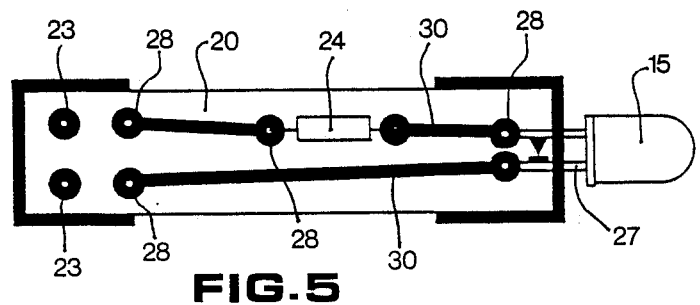
FIG. 5 is a top view of the printed circuit board of the compact telephone line test apparatus.
Figure 6:
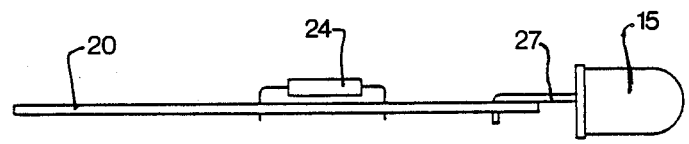
FIG. 6 is a side view of the printed circuit board shown in FIG. 5.

FIGS. 5 and 6 show the orientation and connections of the various elements to the printed circuit board 20. The conductive network 30 is shown disposed on one side of the printed circuit board 20. Apertures 28 are disposed at predetermined locations in the PCB 20 for connection of the electronic components. The conductive network 30 communicatively links the apertures 28 in a predetermined configuration. The strain relief apertures 23 are shown disposed at one end of the PCB 20 for receiving the tie wrap 26.

Figure 7:
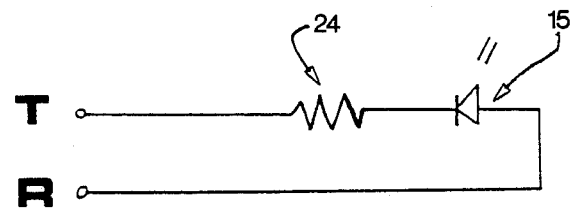
FIG. 7 is a schematic diagram of the circuitry of the compact telephone line test apparatus of this invention.

FIG. 7 shows a schematic diagram of the low voltage circuitry of the telephone line test apparatus 10. The circuitry includes the resistor 24 and light emitting diode 15 which are connected in series via the conductive network 30, and disposed in a particular orientation with the tip and ring contacts ("T" and "R"). Resistor 24 limits current to the LED 15, which has an operating range of approximately 5-25 milliamps. Thus, a resistance value of approximately 2-8 kilohms for resistor 24 provides required current limitation under normal telephone line voltages of 48-52 volts. However, because of inherent line-voltage fluctuations due to the variance in cable power losses, cable lengths, and in the types of central office equipment used, the resistor 24 has a preferred value of approximately 3.3 kilohms. This value provides maximum LED 15 illumination and short prevention over a broad operating range.

Importantly, the LED 15 is a tri-state light emitting diode manufactured by Toshiba, for example. The use of such an LED 15 on the circuitry shown will illuminate in one of three colors to indicate a specified line status. The LED 15 lights green, for example, if the line service is in good repair when there is circuit continuity due to present D.C. voltage and proper polarity. The LED 15 illuminates red, for example, to indicate a continuous D.C. circuit with a polarity reversal. The LED 15 lights yellow or amber, for example, if A.C. voltage is detected on the line. And, the LED 15 will fail to light to indicate the lack of circuit continuity as, for example, in a dead line.

The exterior of housing structure 11 preferably has graphic or printed indications for use of the telephone line test apparatus 10 by identifying the various activation states of the LED 15. For example, a designation of the activation state colors green, red, yellow, and "no light" are preferably correlated with the respective indications of "Line OK," "Line Reverse," "A.C. Voltage," and "Dead Line." Such graphic indications make it easy for both the telephone technician and consumer to quickly and easily determine the status of the telephone line being tested.

As many changes are possible to the embodiments of this invention, utilizing the teachings thereof, the descriptions above and the accompanying drawings should be interpreted in the illustrative and not the limited sense.

That which is claimed is:

1. A compact telephone line test apparatus to determine the operative status of a telephone line having a modular connector comprising:

(a) a housing structure having a hollow interior and opposing first and second apertured ends;

(b) a tri-state light emitting diode of a predetermined length having predetermined activation states and being partially disposed within said housing structure and through said first aperture along its length so that it extends to the exterior of said housing structure to provide a wide angle viewing perspective;

(c) current limiting means disposed within said housing structure interior;

(d) a printed circuit board to electrically connect in series, said light emitting diode and said current limiting means, said printed circuit board being fixed within said housing structure and engaged by said housing structure interior so that it maintains said light emitting diode in said extended position; and (e) modular connection means being communicatively connected to said printed circuit board and extending from said second aperture of said housing structure whereby said tri-state light emitting diode visually indicated the operative status of the telephone line when said modular connection means is connected to the telephone line.

2. The telephone line test apparatus of claim 1, wherein said housing structure has a cylindrical configuration of a predetermined length with opposing ends, said first and said second apertures being located in said opposing ends.

3. The telephone line test apparatus of claim 1, wherein said housing structure has fastening means disposed thereon.

4. The telephone line test apparatus of claim 1, wherein said housing structure further has a gasket in said first aperture for holding said light emitting diode therein.

5. The telephone line test apparatus of claim 1, wherein said light emitting diode is inactive when no voltage is present and has means to indicate three states of activation including D.C. voltage presence with correct polarity, D.C. voltage presence with a polarity reversal and A. C. voltage presence.

6. The telephone line test apparatus of claim 1, wherein said current limiting means is a resistor of about 3.3 kilohms.

7. The telephone line test apparatus of claim 1, wherein said printed circuit board has a conduction network disposed on a single side.

8. The telephone line test apparatus of claim 1, wherein said modular connection means is a snap-type, quick release modular plug.

9. The telephone line test apparatus of claim 1, wherein said modular connection means comprises a modular plug and a flexible, two-conductor cable of a predetermined length, said flexible cable communicatively connecting said modular plug to said connection means.

10. The telephone line test apparatus of claim 9, additionally comprising strain relief means securing said cable to said connection means.

11. The telephone line test apparatus of claim 10, wherein said strain relief means comprises strap means wrapped around said cable and said connection means.

12. The telephone line test apparatus of claim 10, wherein said connection means comprises a printed circuit board having apertures, and wherein said strain relief means comprises strap means secured through said printed circuit board apertures to hold said cable to said printed circuit board.

13. The telephone line test apparatus of claim 9, additionally comprising sealing means disposed in said second aperture of said housing structure.

14. The telephone line test apparatus of claim 13, wherein said sealing means comprises a plug structure adhesively bonded in said second aperture and having a cable aperture generally centrally disposed therein, through which said cable extends.

15. The telephone line test apparatus of claim 1, wherein the overall length of the apparatus is approximately 5.0 inches (120 mm).

16. A compact, portable and modular test apparatus for connection with a telecommunications line system at a modular connector to test the status of the system, comprising:

(a) a cylindrical housing structure having a hollow interior of a predetermined length and diameter, and first and second apertures disposed at its ends;

(b) a printed circuit board of a length and width substantially equivalent to said length and diameter, respectively, of said housing structure interior, said printed circuit board having a conductive network and being frictionally fixed in position within said housing structure by said hollow interior;

(c) a tri-state light emitting diode having a plurality of activation states and a 3.3 kilohm resistor connected in series in said conductive network of said printed circuit board, said light emitting diode being anchored to said printed circuit board and extending through said first aperture for wide angle viewing on the exterior of said housing structure; and (d) a two conductor cable having a terminal modular connector communicatively connected to said printed circuit board conductive network and extending from said second aperture of said housing structure, said terminal modular connector being connectible to the telecommunications line system connector, whereby said tri-state light emitting diode indicates the operative status of the telecommunications line system.

17. A compact telecommunications test apparatus for testing the status of a single pair of telecommunications tip and ring conductors from a modular interface connection comprising:

(a) a generally cylindrical and hollow housing structure having a hollow interior of a predetermined length and diameter, a first aperture at one end of a diameter less than said diameter of said housing structure, and a second aperture at its opposite end of a diameter equivalent to said diameter of said housing structure;

(b) a planar printed circuit board disposed within said housing structure and having a length and width substantially equivalent to said length and said diameter, respectively, of the interior of said housing structure so that it is frictionally fixed within said housing structure interior, said printed circuit board further having a conductive network and a pair of strain relief apertures disposed proximate said second aperture of said housing structure;

(c) a tri-state light emitting diode and a 3.3 kilohm resistor connected in series in said conductive network, said light emitting diode having a red activation state indicating D.C. voltage and improper polarity, a green activation state indicating D.C. voltage and proper polarity, and an amber activation state indicating A.C. voltage, and being disposed in said housing structure and extending out said first aperture to provide a wide angle viewing perspective, said light emitting diode further being frictionally fitted in said first aperture via a gasket, and connected to said printed circuit board by rigid electrodes which are soldered thereto;

(d) a flexible two-conductor cable having terminal modular connection means and being connected to said printed circuit board conductive network and which extends from said second aperture of said housing structure;

(e) a plug structure including a third aperture through which said cable extends, said plug structure being disposed in said second aperture of said housing structure and preventing movement of said printed circuit board in said lengthwise direction in said interior of said housing structure; and (f) a strain relief fastening cord to secure said cable to said printed circuit board, said strain relief fastening cord extending through said strain relief apertures of said printed circuit board, and engaging said cable with said printed circuit board, whereby said light emitting diode is positively maintained in said extended position through said first aperture and visually indicates the voltage and polarity status of the telecommunications tip and ring conductors when said modular connection means is connected to the modular interface connection.

* * * * *